(No Model.)

C. S. SELLERS.
WINDMILL.

No. 308,205. Patented Nov. 18, 1884.

Witnesses,
Geo. H. Strong
J. H. Towne

Inventor,
Chas. S. Sellers
By Dewey & Co.
Attorneys

N. PETERS. Photo-Lithographer. Washington, D. C.

UNITED STATES PATENT OFFICE.

CHARLES S. SELLERS, OF BRENTWOOD, CALIFORNIA.

WINDMILL.

SPECIFICATION forming part of Letters Patent No. 308,205, dated November 18, 1884.

Application filed November 12, 1883. (No model.)

*To all whom it may concern:*

Be it known that I, CHARLES S. SELLERS, of Brentwood, county of Contra Costa, and State of California, have invented an Improvement in Windmills; and I hereby declare the following to be a full, clear, and exact description thereof.

My invention relates to that class of windmills in which the length of the stroke of the pitman is governed by the varying force of the wind acting upon a graduated crank, and which are thrown out of the wind by an upright vane acting on the turn-table.

My invention consists in a novel means for rendering effective the graduated crank, in the means by which it is connected with the pitman, and in the means by which the upright vane is connected with the turn table, all of which I shall hereinafter fully explain by reference to the accompanying drawings, in which—

Figure 1:
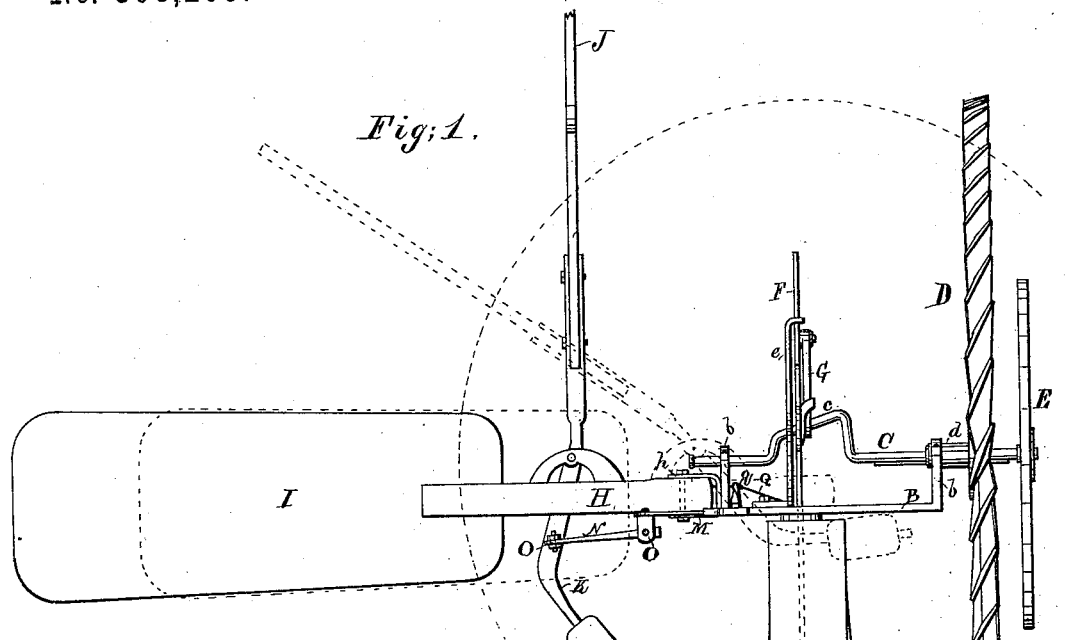
Figure 3:
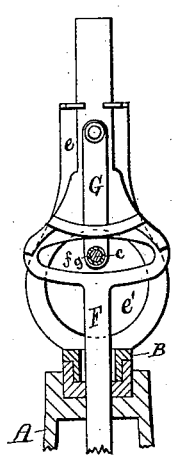
Figure 2:
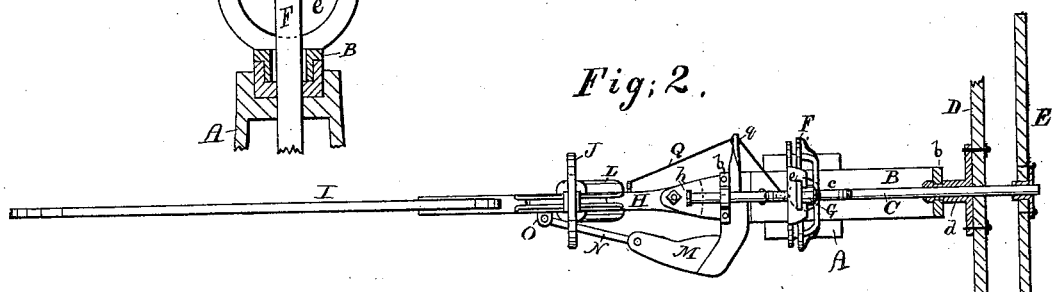

Figure 1 is a side elevation of my mill. Fig. 2 is a top view of same. Fig. 3 is a front elevation of pitman-connection with the graduated crank.

The object of my improvements is to enable me to provide a simple and effective windmill.

A is the tower, in the top of which is pivoted the turn-table B, consisting of a flat bar having upward-turned ends $b$. In these ends is mounted the shaft C, upon which is made an inclined or graduated crank, $c$.

The wheel D, which may be of any suitable pattern, has a hub, $d$, which is mounted to revolve in the end of the turn-table, and is feathered on the shaft C, so that said shaft is affected by its revolution, and yet may move back and forth in its bearing. Upon the outer end of the shaft C is secured a wind plate or disk, E.

F is the pitman, having a wide transversely-slotted body, $f$, above the turn-table, and extending up through a guide-standard, $e$, thereon. This standard has a circular aperture, $e'$, through which the crank $c$ passes, and of a diameter large enough to permit the greater throws of the crank. To the pitman above its wide body is pivoted a short arm, G, in the lower end of which the crank $c$ is journaled by means of a ball-and-socket joint, $g$. When the wheel is operating in a light wind, the tendency of the shaft C is to slip outwardly to the smallest throw of the crank, so that the mill will not work hard, and thereby utilize the full power of the wind; but when the wind increases in force it acts against the wind-plate E and forces it in toward the face of the wheel, thereby sliding the shaft C back toward the greater throw of the crank, so that in proportion to the force of the wind the stroke is increased and more water is pumped.

The connection I have shown between the pitman and the graduated crank I regard as advantageous, in that I need not make a joint in the pitman, but allow it to reciprocate directly, and not have to follow the revolution of the crank.

The advantage of the means shown for moving the sliding shaft over those in which the whole wheel is moved in and out to accomplish the result is that my wheel remains in the same plane, and is not subjected to the strain of forcing the shaft, which would have a tendency to wrench it and make it work loose on its bearing.

Extending from the outer face of one of the ends of the turn-table is a bearing, $h$, in which is pivoted the shank H of the vane I, which keeps the wheel in the wind. The shank H is slotted vertically, and has pivoted therein the vertical regulating-vane J, the lower end of which, extending below the shank H, has secured to it an angled arm, K, carrying a weight, L, under the influence of which the vane J is held perpendicularly. Extending back from the turn-table is an arm, M, between which and the lower end of the vane J a connection is made by a rod, N, pivoted to each by means of bearings O, which are themselves pivoted to the parts they join, so as to have an oscillating motion to permit the free operation of the connecting-rod. The weight L is so regulated as not to be overcome by any force of wind which it is intended the wheel shall stand, so that up to this limit the wheel is held in the wind by the vane I; but beyond this the power of the wind, acting against the upright vane, throws it back, causing its lower end to push upon the turn-table and turn the wheel around to a parallel plane with the vane I out of the wind. Of course this operation is not instantaneous, but is gradual, according to the increasing force of the wind. This effect is produced rather than the reflex effect upon the vane I, because it requires much less power to turn the wheel out of the wind than to turn the vane I into it. As the wind decreases in force the weight throws the wheel back into the wind.

In order to throw the mill out of the wind from below, I have the rope Q secured to one side of the shank H of vane I, thence passing over pulleys $q$ down to within reach. By pulling on this rope the vane I is pulled into the wind parallel with the wheel, which thereupon turns both out again.

Having thus described my invention, what I claim as new, and desire to secure by Letters Patent, is—

1. In a windmill, the movable or sliding shaft C, having the graduated crank $c$, in combination with the pitman F, having the wide transversely-slotted body $f$, through which the crank passes, and the arm G, pivoted on said pitman above the crank, and connected with said crank, substantially as herein described.

2. In a windmill, the movable or sliding shaft C, having the graduated crank $c$, in combination with the pitman F, having the wide transversely-slotted body $f$, through which the crank passes, the perforated guide-standard $e$, and the arm G, pivoted on said pitman above the crank and connected with said crank, substantially as herein described.

In witness whereof I have hereunto set my hand.

CHARLES S. SELLERS.

Witnesses:
C. D. COLE,
J. H. BLOOD.